(12) United States Patent
Kirkland et al.

(10) Patent No.: US 11,415,263 B2
(45) Date of Patent: Aug. 16, 2022

(54) CONVERSION KIT FOR A SUPPORT FRAME, A SUPPORT FRAME AND AN INTEGRATED VACUUM SYSTEM MOUNTED IN A SUPPORT FRAME

(71) Applicant: Edwards Vacuum LLC, Sanborn, NY (US)

(72) Inventors: Ian Patrick Kirkland, Portland, OR (US); Brian James McDowell, Forest Grove, OR (US); Gregory Ryan Le Mon, Beaverton, OR (US); Jacob Henry Goeke, Beaverton, OR (US)

(73) Assignee: Edwards Vacuum LLC, Sanborn, NY (US)

( * ) Notice: Subject to any disclaimer, the term of this patent is extended or adjusted under 35 U.S.C. 154(b) by 24 days.

(21) Appl. No.: 16/825,190

(22) Filed: Mar. 20, 2020

(65) Prior Publication Data
US 2021/0293374 A1    Sep. 23, 2021

(51) Int. Cl.
| | | |
|---|---|---|
| *F16M 11/00* | (2006.01) | |
| *F16M 11/18* | (2006.01) | |
| *F16M 1/00* | (2006.01) | |
| *F16M 11/04* | (2006.01) | |
| *B66F 3/24* | (2006.01) | |

(52) U.S. Cl.
CPC ............. *F16M 11/18* (2013.01); *F16M 1/00* (2013.01); *F16M 11/046* (2013.01); *B66F 3/24* (2013.01)

(58) Field of Classification Search
CPC ....... F16M 11/18; F16M 11/00; F16M 11/046
See application file for complete search history.

(56) References Cited

U.S. PATENT DOCUMENTS

| | | | | |
|---|---|---|---|---|
| 4,232,901 A | * | 11/1980 | Harrington | A47C 16/025 |
| | | | | 297/423.45 |
| 7,494,805 B2 | * | 2/2009 | Sisk | A61P 31/12 |
| | | | | 435/320.1 |
| 8,944,398 B1 | * | 2/2015 | Miller | A61G 5/14 |
| | | | | 248/421 |
| 10,932,572 B1 | * | 3/2021 | Leggette | A47C 7/006 |

* cited by examiner

*Primary Examiner* — Amy J. Sterling
(74) *Attorney, Agent, or Firm* — Shumaker & Sieffert, P.A.

(57) ABSTRACT

A kit may include at least one frame lifting mechanism configured to be mounted within the support frame. The lifting mechanism may include a movable element configured to be movably mounted to the frame and an extendible member configured to extend between the movable element and a static member mounted on the frame. The movable element includes at least one support portion extending from a lower surface of the movable element when the movable element is mounted to the frame. The extendible member is configured to be movable between a compressed state and an extended state. The movable element is configured to be mounted to the frame such that on extension of the extendible member the movable element is pushed downwards and the at least one support portion moves below a base of the frame and provides a lifting force to the frame.

19 Claims, 3 Drawing Sheets

CONVERSION KIT FOR A SUPPORT FRAME, A SUPPORT FRAME AND AN INTEGRATED VACUUM SYSTEM MOUNTED IN A SUPPORT FRAME

TECHNICAL FIELD

The application relates to a conversion kit for converting a support frame for an integrated vacuum system from a static to a movable frame, the support frame and the integrated vacuum system.

BACKGROUND

Integrated vacuum systems such as those used in sub fabs are conventionally assembled at the place of use, such as within the sub fab, and this can take service engineers several days to do. Furthermore, the assembly of these systems inhibits the operation of other nearby systems.

The integrated vacuum system may comprise multiple vacuum pumps, control electronics and in some cases abatement units. These components are relatively bulky and heavy, a typical integrated system may weigh more than 2,300 Kg (more than 5,000 lbs). Furthermore, they require periodic maintenance and servicing and thus, should be mounted in a way that allows access to the different components. Conventionally an integrated system has been mounted within a support frame which allows the limited space to be used efficiently while still providing access to the different components.

The operation environment of the integrated vacuum system may in many cases be in a confined space such as in a sub fab. Thus, although it would seem to be desirable to assemble an integrated system outside of the operation environment, moving an assembled system into the operational environment can be challenging both due to limited space and to the weight of the system.

It would be desirable to be able to provide a support frame for an integrated vacuum system that allows the assembled system to be moved.

SUMMARY

A first aspect provides a kit for converting a support frame for an integrated vacuum system from a static to a movable support frame, the kit comprising: at least one frame lifting mechanism configured to be mounted within the support frame and comprising: a movable element configured to be movably mounted to the frame. The lifting mechanism comprises at least one support portion extending from a lower surface of the movable element when the movable element is mounted to the frame; an extendible member configured to extend between the movable element and a static member mounted on the frame, the extendible member being configured to be movable between a compressed state and an extended state; wherein the movable element is configured to be mounted to the frame such that on extension of the extendible member the movable element is pushed downwards and the at least one support portion moves below a base of the frame and provides a lifting force to the frame.

The inventors of the present disclosure recognised that it might be desirable to provide a support frame for supporting an integrated vacuum system that could be moved. They recognised that one way of doing this would be to provide a kit for converting a support frame for supporting an integrated vacuum system such that the frame and integrated system supported by it could be moved. This would allow the system to be assembled outside of its operational environment and then transported to the place of operation in an assembled state.

Strengthening the frames and providing a base plate in cases where there is not one, might allow the frame to be moved but where there is limited space in the place of operation, then this would not address how the frame is to be lifted. Lifting a frame that supports heavy components and has a base that is flush with the floor requires lifting equipment that extends around and/or above the frame. Such equipment cannot be used in locations where there is limited space. The inventors have addressed this by providing a kit for adapting such support frames, which kit provides at least one lifting mechanism that is mounted within the support frame and has an extendible portion that extends to push at least one support portion downwards through a base of the support frame and thereby provides a lifting force to the support frame from within it. In this way the overall footprint of the support frame is not increased and although when the extendible member is extended the height of the support frame is increased, this increase can be controlled and may be selected to be relatively small. By lifting the base of the frame in this way access can be provided under the base for moving equipment thereby allowing such equipment to move the support frame from one location to another without the need for the moving equipment to extend above or around the integrated system. It should be noted that although the movable element and extendible member may be two different components, in some cases, they may be different portions of one single element.

Although the static member that the extendable member abuts against may be part of the frame, in some embodiments the kit comprises the static member, the static member being configured to be rigidly attached to the frame.

In some embodiments, the movable element comprises two support portions, the two support portions comprising rods extending vertically downwards from a lower surface of the movable element when the movable element is mounted to the frame.

The moveable element is configured so that when mounted to the frame it is pushed downwards by extension of the extendible member and the support portion(s) travel below the frame and contact the ground, which impedes further movement downwards. At this point further extension of the extendible member causes the frame to lift, the lifting force being exerted by the end of the extendible member that abuts against the static member.

The support portions pass through passages within the base which may be in the form of indents towards the side edge of the base or may be apertures within the base.

In some embodiments, the movable element comprises a cross member configured to extend substantially horizontally when mounted to the support frame, an upper surface of the cross member abutting with the extendible member.

The movable element may comprise a cross member which supports the two support portions and provides a means for transferring the vertical force from the extension of the extendible member to both support portions.

In some embodiments, the kit further comprises at least one sleeve configured to attach to the base and to extend vertically upwards from the base, the at least one sleeve being configured to receive and guide the at least one support portion.

In order to inhibit horizontal motion when the support frame is being lifted, it may be advantageous to provide a sleeve member adapted to surround the support portion(s)

and provide a guide for them as they move vertically to lift the support frame. In particular, where there are two support portions connected by a horizontal cross member, the sleeves inhibit horizontal or rotational movement and help guide the two support portions to move vertically.

In some embodiments, the moveable element further comprises a prop pivotably mounted to the movable element such that when the movable element is mounted to the frame, the prop can pivot between a substantially horizontal and a substantially vertical position, the prop being configured to extend between the movable element and the static member when the extendible member is extended and the prop is pivoted to a vertical position.

In some embodiments, it may be advantageous to provide a prop that can be pivoted in place and rigidly holds the extendible member in its extended position and locks the frame in a lifted position. This may be used as a safety mechanism that will inhibit the frame from falling to the floor if the extendible member compresses unexpectedly. The pivot may be manually pivoted from the horizontal to the vertical position to provide this locking mechanism. It may have releasable means for locking the pivot in the vertical position.

Although, the extendible member may be driven to its extended position using an external driving mechanism, in some embodiments the lifting mechanism and in some cases the extendible member comprises a drive mechanism for driving the extendible member between the compressed and extended state.

In some embodiments, the extendible member comprises a hydraulic jack.

The extendible member may have a number of forms and may be driven in a number of ways. For example, it may comprise a screw thread and be driven by a rotating mechanism, or it may be driven by a hydraulic drive. In some embodiments the extendible member itself comprises a hydraulic jack.

In some embodiments, the kit further comprises at least one biasing element configured to be mounted between the static member and movable element and configured to bias the movable element towards the static member.

In order for the extendible member to move back to the compressed state from the extended state where it is lifting the frame, in some cases there is a biasing element present configured to bias the static member and movable element towards each other. In this this way when any driving force driving the extendible member to the extended position is no longer exerted on the extendible member then the biasing element will ensure that the extendible member contracts back to its compressed state under the force of the biasing element. In some cases, the biasing element may be one or more springs mounted between the static and the moveable members.

In some embodiments, the kit comprises two lifting mechanisms.

It may be advantageous for the kit to have more than one lifting mechanism within it such that these mechanisms may be mounted on opposing sides of the lifting frame and provide a more stable means of lifting the frame with force exerted from each side. In other cases, there may be four lifting mechanisms for the four sides of the frames.

It should be understood that although additional lifting mechanisms may increase the cost of the kit, having several may enable each lifting mechanism to exert a smaller force and to have less robust elements within them and thus, be produced at a lower cost.

In some embodiments, the kit further comprises bracing means for mounting between legs of the frame.

In addition to providing a lifting mechanism to the support frame, the kit may also provide one or more strengthening members in some cases in the form of cross members, which provide additional bracing and provide increased rigidity to the frame allowing it to rigidly support the different components of the system when the frame is being moved.

A second aspect provides a support frame for mounting an integrated vacuum system, the support frame comprising a base comprising a substantially rectangular cross section, at least four legs extending from each corner of the base and cross pieces extending between the legs, the support frame further comprising the components of the kit according to a first aspect mounted to the support frame.

A support frame may be provided for mounting an integrated vacuum system. The support frame comprises a base that may have a substantially rectangular cross section and that is robust enough to support the components of the integrated vacuum system. In some cases, the base may comprise a metal plate. There may be frame legs or edge pieces extending upwardly from each corner and there may be additional legs between the corners to provide additional support. Cross pieces may extend between the legs providing increased rigidity. The support frame may comprise components of the kit of a first aspect mounted to the frame. That is there may be one or more lifting mechanisms mounted to the frame such that the movable support portions extend through the base on extension of the extendible member(s) and provide a lifting force to the support frame.

In some embodiments, the two lifting mechanism are mounted to the support frame on opposing sides of the support frame and within an outer envelope of the support frame.

The lifting mechanisms may be mounted on opposing sides of the support frame to provide a lifting force that, where they are activated at substantially the same time does not tilt the frame but lifts it such that the components are maintained substantially horizontally.

In some embodiments, the support frame comprises an actuating mechanism for actuating the two lifting mechanisms at substantially the same time.

In some embodiments the actuating mechanism may be control circuitry or a simple switch that activates the driving mechanism associated with the extendible members.

In some embodiments, the two lifting mechanisms are mounted to the support frame such that that the extendible mechanisms of the two lifting mechanism are located in line with the centre of gravity between the two sides of the frame that the lifting mechanisms are not mounted adjacent to.

In order to provide additional stability, it may be advantageous if the extendible members are in line with each other and with the centre of a gravity that lies between the two other sides of the frame that the lifting mechanisms are not adjacent to. This allows the frame to be lifted with reduced tilting forces.

In some embodiments, the base of the support frame comprises at least one passage extending through the base, and a sleeve surrounding an upper end of the at least one passage and extending vertically upwards from the at least one passage and configured to receive and guide the at least one support portion.

The base may have a passage in the form of an aperture or indent that allows the support portion of the moveable element to extend to the floor and exert a force on the floor when the extendible member extends. There may be a sleeve extending vertically around this passage for the support member to pass through, which sleeve inhibit horizontal movement of the support portion.

A third aspect provides an integrated vacuum system, the integrated vacuum system comprising a plurality of components including a plurality of dry vacuum pumps; and control circuitry, the plurality of components being mounted on a support frame according to a second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present disclosure will now be described further, with reference to the accompanying drawings.

DETAILED DESCRIPTION

Before discussing the embodiments in any more detail, first an overview will be provided.

Embodiments seek to provide a kit for converting a support frame for an integrated vacuum system such that the integrated vacuum system is able to be assembled off-site and then safely transported to the site of use. In some embodiments, the site of use is a datum location in a subfab. The frame is configured such that it can be moved in a single piece and the conversion is such that it does not increase the footprint of the frame, although a small increase in height is allowed. In this regard although the converted frame does not extend outside of the footprint of the original frame when lifted the frame may increase in height.

Embodiment provide additional functionality to a support frame for an integrated pumping system, the additional functions provided comprises: structural stability that is required for ground transport of a fully populated pump frame, and the ability of the pump frame to lift itself off the ground in order to more readily accommodate moving or rigging equipment.

The kit comprises a plurality of components that are mounted to a support frame to provide this improved functionality.

Figure 1:
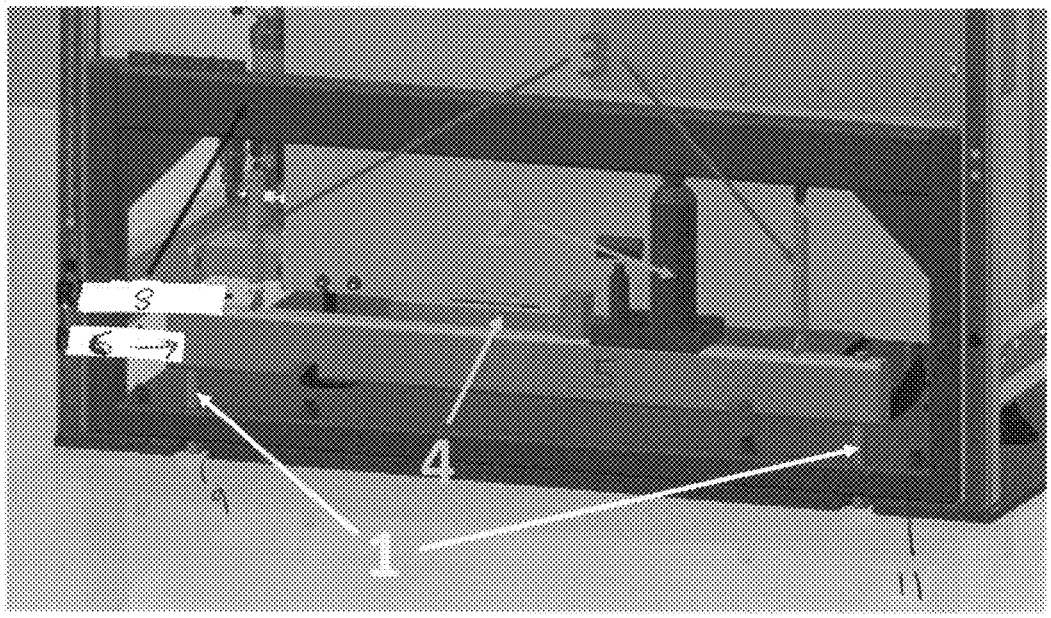
FIG. 1 shows a lifting mechanism of a kit according to an embodiment.

FIG. 1 shows the lifting mechanism portion of the kit according to an embodiment mounted on a frame. The lifting mechanism comprises a movable member 6 that comprises a horizontal cross member 5 and two supporting legs 1 extending from a lower surface of the horizontal member.

The two supporting legs 1 extend through an indent 9 in the side of the base which indent provides a passage for the support legs 1 to pass below the base and contact the floor.

The moveable element 6 moves downwards in response to extendible member, in the form of hydraulic jack 2 extending from a compressed position to an extended position.

Hydraulic jack 2 extends between a static rigid cross member 8 and the horizontal cross member 5 of moveable element 6 and on extension pushes the movable element down such that the supporting legs 1 pass through the base via indent 9 and push against the floor. This impedes their movement and the hydraulic jack 2 continues to extend by pushing rigid cross member 8 upwards, thereby causing the frame to lift.

Although not shown in this figure there are two lifting mechanisms on either side of the frame which act together to cause the two sides of the frame to lift in unison. Were they not actuated together the frame could still be lifted but there would be some tilting which it may be preferable to avoid. In effect the movable element is driven by the jack 2 which results in a downward force on the moving cross member 5 which moves the cross member down until the rods 1 contact the floor at which point the force from the jack lifts the frame. The jacks are located in line with the front-to-back Center of Gravity of the entire assembled frame so that the frame is lifted evenly. In addition, there may be actuating means configured such that both jacks are operated simultaneously so that the lifting motion is smooth.

The rigid cross member 8 is in this embodiment part of the lifting mechanism that is attached to the frame as part of the kit to convert it from a static to a movable frame. In other embodiments, there may be a rigid member that is part of the frame and the lifting mechanism may be mounted such that the hydraulic jack 2 abuts against that rigid member.

Also shown in FIG. 1 is a kick stand or prop 4 which is pivotally mounted on the cross member 5 such that it can pivot between a horizontal position shown and a vertical position. It can be pivoted to the vertical position when the hydraulic jack 2 is in its extended position and in this configuration extends between the movable cross member 5 and the static member 8 and holds them apart. This can be used as a safety mechanism that inhibits the frame from falling to the floor were the hydraulic jack 2 to fail. The prop 4 can be manually rotated from the horizontal position shown into the vertical position by way of a pinned joint between it and the moveable cross member 5. In the vertical position it may be located via a spring plunger into a hole on its mounting bracket to prevent it from pivoting inadvertently.

Two extension springs 3 are shown located between the moving cross member 5 and the rigid cross member 8. When the jack is extended and the frame is lifted, the springs are also extended and exert an upward vertical force on the moving cross member. This force functions to pull the moving cross member up and out of the way in the event that the force from the jack is removed, which occurs where for example, the whole frame is supported by a secondary piece of equipment. This may be a roller placed underneath the frame after it has been jacked up and prior to moving it. At this point the jacks can be retracted and the springs will return the moving cross member to its upper position. This retracts the supporting legs 1 enabling the frame to be moved unimpeded by these legs.

Figure 2:
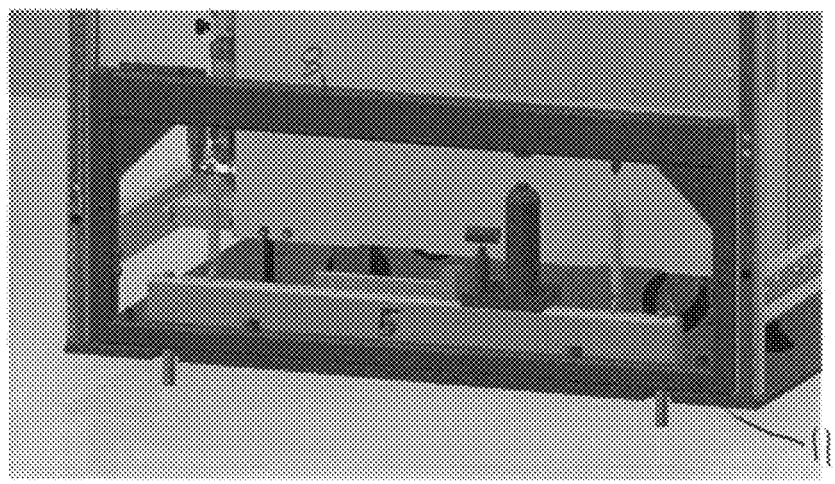
FIG. 2 shows a lifting mechanism with the legs extending through the base.

FIG. 2 shows the lifting mechanism with the supporting legs extending through the base, In this figure the moving and extendible element have not been mounted to the rigid member 8 The jack 2 may be attached to rigid member 8 by some means such that it abuts against it or it may be biased against it by springs 3 which are attached to the rigid cross member 8 as shown in FIG. 1.

Figure 3:
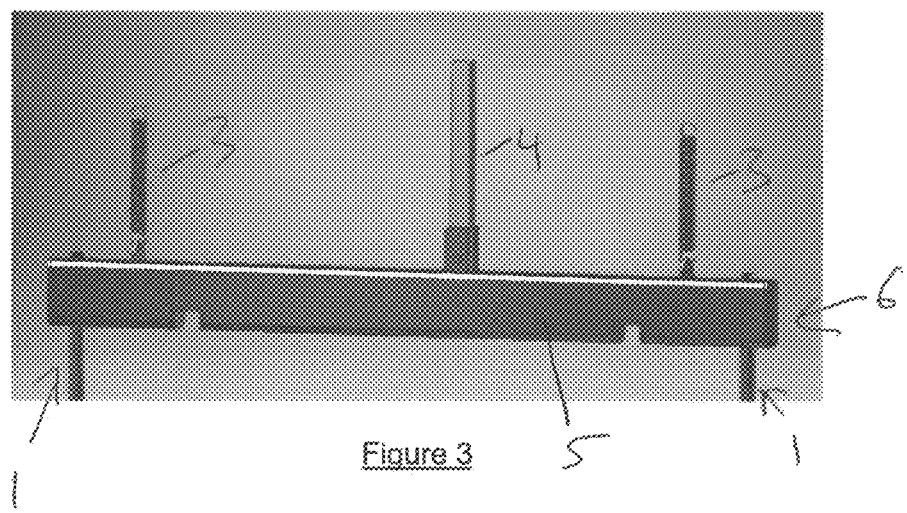
FIG. 3 shows the movable element of the lifting mechanism.

FIG. 3 shows the movable element 6 in more detail and with prop 4 in the vertical position. Moveable element 6 comprises horizontal cross member 5 two biasing springs 3 and prop 4. It also comprises the supporting legs 1 extending vertically downwards from the cross member 5. These legs may be stainless steel rods which are configured to be strong enough to lift the frame. The base of the frame comprises two cylindrical sleeves configured for the rods to slide through as they move vertically. FIGS. 1 and 2 show a lower cross member 11 which is bolted to the base of the frame and in which the cylindrical sleeves are located.

The horizontal cross member 5 provides a means for exerting force on each support leg 1, while the sleeves act as guides to limit any movement of the cross member 5 and rods 1 to the vertical axis, such that horizontal and rotational movement are inhibited. This enables the two legs 1 to move together to lift the frame without tilting.

In the embodiments shown in FIGS. 1 and 2 the static cross member 8 is part of a rectangular frame which comprises a lower cross member 11 through which the supporting legs pass and which comprises cylindrical passages which acts as the sleeves for guiding the supporting legs in a vertical direction. This rectangular frame configuration allows the lifting mechanism to be mounted to the support frame in a relatively simple manner.

Figure 4:
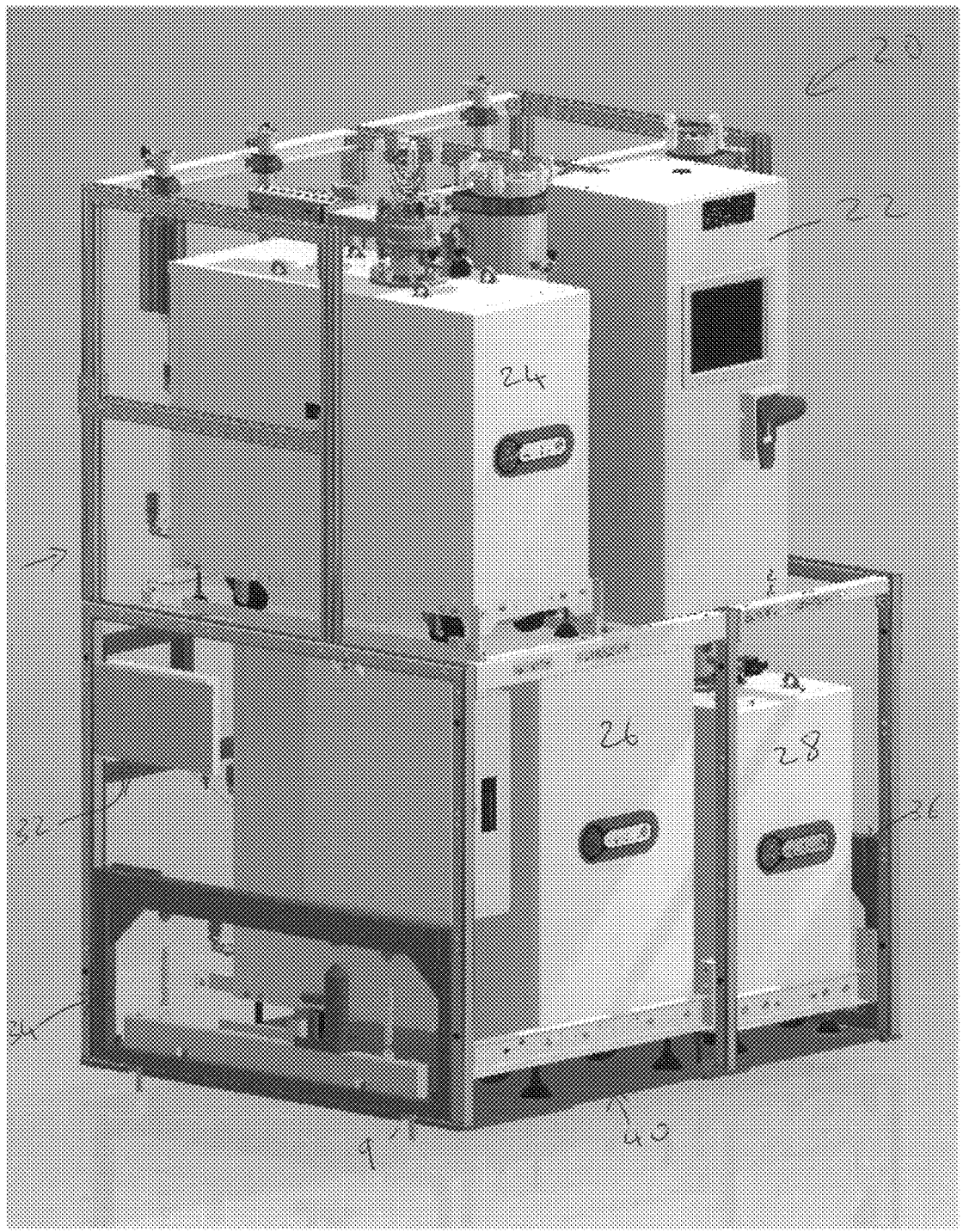
FIG. 4 shows the integrated vacuum system.

FIG. 4 shows an integrated vacuum system according to an embodiment. Integrated vacuum system 20 comprises control circuitry 22 and a plurality of dry vacuum pumps 24, 26 and 28. The kit for converting the frame 30 to a movable frame comprises a bracing member 32 running between the two legs shown towards the rear of the assembly and two lifting mechanisms 34, 36 mounted on opposing sides of the frame and being configured to be actuated at substantially the same time so that they lift the frame from either side in unison. These lifting mechanisms 34, 36 are shown in more details in FIGS. 1 to 3.

In this embodiment, base 40 is also shown. Base 40 comprises a steel plate configured to support the weight of the integrated vacuum system. Base 40 has apertures or indents 9 which allow passage of the supporting legs 1 of lifting mechanisms 34 and 36 to pass below the base 40 onto the floor and provide the lifting force to the frame to lift it away from the floor. When the frame is lifted to its elevated position a moving mechanism can be placed beneath the frame and it can be moved into place without the need to use a lifting mechanism such as a hoist which requires substantial space above and around the frame.

In summary a conversion kit, support frame and integrated vacuum system are disclosed. The conversion kit is made up of components some of which are configured to be statically attached to the support frame and all of which when mounted are within the envelope of the frame. There is a movable element disclosed that when moved provides a lifting force to lift the frame from the ground allowing access beneath a base plate.

In some embodiments the kit comprises one or more pump installation/removal ramps. The baseplate comprises features into which the ramp locates such that it is held firm during pump installation and removal. The ramp is handled manually.

The kit is configured such that the aspects of the frame that are altered do not unduly impede access to the integrated vacuum system components and thus, do not impact maintenance. Generally, the frame interfaces remain the same as a typical integrated system.

The main safety hazards associated with this kit are pinching and crushing hazards due to the lifting of large loads. This has been mitigated by the addition of a safety prop or 'kick stand' that will keep the frame lifted if a lifting device (such as a bottle jack) fails.

The only operation required for this product are the operation of the driving mechanism for the extendible member which in this case are bottle jacks.

The are several key benefits of embodiments:
Reduced installation time in the subfab
Reduction in time service engineers spend in the subfab, which limits risk of injury
The ability to pre-build systems, thus reducing the number of personnel required to support rapid integrated vacuum system installation.

Embodiments provide a system that integrates the bracing with the frame, adds a lifting mechanism to provide access underneath the frame for other lifting equipment, and in some cases provides one or more removable pump ramps that allow pumps to be installed and removed from the frame without additional equipment.

The system is able to lift itself off the ground plane while supporting the full load of all installed components. There is no impact on the footprint of the tool, which is achieved by nesting the lifting mechanism within the confines of the existing frame legs.

In some examples, the disclosure may be expressed by the following clauses.

Clause 1: A kit for converting a support frame for an integrated vacuum system from a static to a movable support frame, the kit comprising: at least one frame lifting mechanism configured to be mounted within the support frame, the at least one frame lifting mechanism comprising: a movable element configured to be movably mounted to the frame and comprising at least one support portion extending from a lower surface of the movable element when the movable element is mounted to the frame; an extendible member configured to extend between the movable element and a static member mounted on the frame, the extendible member being configured to be movable between a compressed state and an extended state; wherein the movable element is configured to be mounted to the frame such that on extension of the extendible member the movable element is pushed downwards and the at least one support portion moves below a base of the frame and provides a lifting force to the frame.

Clause 2: The kit according to clause 1, further comprising the static member, the static member being configured to be rigidly attached to the frame Clause 3: The kit according to any preceding clause, wherein the movable element comprises two support portions, the two support portions comprising rods extending vertically downwards from a lower surface of the movable element when the movable element is mounted to the frame.

Clause 4: The kit according to any preceding clause, wherein the movable element comprises a cross member configured to extend substantially horizontally when mounted to the support frame, an upper surface of the cross member abutting with the extendible member.

Clause 5: The kit according to any preceding clause, the kit further comprising at least one sleeve member configured to attach to the base and to extend vertically upwards from the base, the at least one sleeve member being configured to receive and guide the at least one support portion.

Clause 6: The kit according to any preceding clause, the movable element further comprising a prop pivotably mounted to the movable element such that when the movable element is mounted to the frame, the prop can pivot between a substantially horizontal and a substantially vertical position, the prop being configured to extend between the movable element and the static member when the extendible member is extended and the prop is pivoted to a vertical position.

Clause 7: The kit according to any preceding clause, the extendible member comprising a drive mechanism for driving the extendible member between the compressed and extended state.

Clause 8: The kit according to clause 7, wherein the extendible member comprises a hydraulic jack.

Clause 9: The kit according to any preceding clause, comprising at least one biasing element configured to be mounted between the static member and movable element and configured to bias the movable element towards the static member.

Clause 10: The kit according to any preceding clause, the kit comprises two lifting mechanisms.

Clause 11: The kit according to clause 10, the kit further comprising bracing means for mounting between frame legs of the frame.

Clause 12: A support frame for mounting an integrated vacuum system, the support frame comprising a base comprising a substantially rectangular cross section, at least four legs extending from each corner of the base and cross pieces extending between the legs, the support frame further comprising the components of the kit according to any preceding claim mounted to the support frame.

Clause 13: The support frame according to clause 12 when dependent on clause 10 or 11, wherein the two lifting mechanism are mounted to the support frame on opposing sides of the support frame and within an outer envelope of the support frame.

Clause 14: The support frame according to clause 13, wherein the two lifting mechanisms are mounted to the support frame such that that the extendible mechanisms of the two lifting mechanism are located in line with the centre of gravity between the two sides of the frame that the lifting mechanisms are not mounted adjacent to.

Clause 15: The support frame according to any one of clauses 12 to 14, wherein the base of the support frame comprises at least one passage extending through the base, and a sleeve extending around and vertically upwards from an upper opening of each of the at least one passage, the sleeve being configured to receive and guide the at least one support portion.

16. An integrated vacuum system, the integrated vacuum system comprising a plurality of components including a plurality of vacuum pumps; and control circuitry, the plurality of components being mounted on a support frame according to any one of clauses 12 to 15.

Although illustrative embodiments have been disclosed in detail herein, with reference to the accompanying drawings, it is understood that the disclosure is not limited to the precise embodiment and that various changes and modifications can be effected therein by one skilled in the art without departing from the scope of the disclosure as defined by the appended claims and their equivalents.

REFERENCE SIGNS 1 support legs
2 driving mechanism
3 springs
4 prop
5 movable cross member
6 movable member
8 static cross member
9 indent
11 lower cross member of lifting mechanism frame
20 integrated vacuum system
22 control circuitry
24, 26, 28 vacuum pumps
30 support frame
32 bracing element
34, 36 lifting elements
40 base

The invention claimed is:

1. A kit for converting a support frame for an integrated vacuum system from a static to a movable support frame, the kit comprising:
at least one frame lifting mechanism configured to be mounted within the support frame, the at least one frame lifting mechanism comprising:
a movable element configured to be movably mounted to the support frame and comprising at least one support portion extending from a lower surface of the movable element when the movable element is mounted to the support frame;
an extendible member configured to extend between the movable element and a static member mounted on the support frame, the extendible member being configured to be movable between a compressed state and an extended state; wherein
the movable element is configured to be mounted to the support frame such that on extension of the extendible member the movable element is pushed downwards and the at least one support portion moves below a base of the support frame and provides a lifting force to the support frame.

2. The kit according to claim 1, further comprising the static member, the static member being configured to be rigidly attached to the support frame.

3. The kit according to claim 1, wherein the movable element comprises two support portions, the two support portions comprising rods extending vertically downwards from a lower surface of the movable element when the movable element is mounted to the support frame.

4. The kit according to claim 1, wherein the movable element comprises a cross member configured to extend substantially horizontally when mounted to the support frame, an upper surface of the cross member abutting with the extendible member.

5. The kit according to claim 1, further comprising at least one sleeve member configured to attach to the base and to extend vertically upwards from the base, the at least one sleeve member being configured to receive and guide the at least one support portion.

6. The kit according to claim 1, wherein the movable element further comprises a prop pivotably mounted to the movable element such that when the movable element is mounted to the support frame, the prop can pivot between a substantially horizontal and a substantially vertical position, the prop being configured to extend between the movable element and the static member when the extendible member is extended and the prop is pivoted to the substantially vertical position.

7. The kit according to claim 1, wherein the extendible member comprises a drive mechanism for driving the extendible member between the compressed state and the extended state.

8. The kit according to claim 7, wherein the extendible member comprises a hydraulic jack.

9. The kit according to claim 1, further comprising at least one biasing element configured to be mounted between the static member and the movable element and configured to bias the movable element towards the static member.

10. The kit according to claim 1, comprising two frame lifting mechanisms.

11. A kit according to claim 10, wherein the kit further comprises bracing means for mounting between frame legs of the support frame.

12. A support frame for mounting an integrated vacuum system, the support frame comprising:
   a base comprising a substantially rectangular cross section;
   at least four legs extending from each corner of the base;
   cross pieces extending between the at least four legs;
   a kit mounted to the support frame, the kit comprising:
      at least one frame lifting mechanism configured to be mounted within the support frame, the at least one frame lifting mechanism comprising:
         a movable element configured to be movably mounted to the support frame and comprising at least one support portion extending from a lower surface of the movable element when the movable element is mounted to the support frame;
         an extendible member configured to extend between the movable element and a static member mounted on the support frame, the extendible member being configured to be movable between a compressed state and an extended state; wherein
         the movable element is configured to be mounted to the support frame such that on extension of the extendible member the movable element is pushed downwards and the at least one support portion moves below a base of the support frame and provides a lifting force to the support frame.

13. The support frame according to claim 12, comprising two frame lifting mechanisms, wherein the two frame lifting mechanism are mounted to the support frame on opposing sides of the support frame and within an outer envelope of the support frame.

14. The support frame according to claim 13, wherein the two frame lifting mechanisms are mounted to the support frame such that the extendible mechanisms of the two frame lifting mechanism are located in line with the centre of gravity between the two sides of the support frame that the lifting mechanisms are not mounted adjacent to.

15. The support frame according to claim 12, wherein the base of the support frame comprises at least one passage extending through the base, and a sleeve extending around and vertically upwards from an upper opening of each of the at least one passage, the sleeve being configured to receive and guide the at least one support portion.

16. An integrated vacuum system, the integrated vacuum system comprising a plurality of components including a plurality of vacuum pumps; and control circuitry, the plurality of components being mounted on a support frame comprising:
   a base comprising a substantially rectangular cross section;
   at least four legs extending from each corner of the base;
   cross pieces extending between the at least four legs;
   a kit mounted to the support frame, the kit comprising:
      at least one frame lifting mechanism configured to be mounted within the support frame, the at least one frame lifting mechanism comprising:
         a movable element configured to be movably mounted to the support frame and comprising at least one support portion extending from a lower surface of the movable element when the movable element is mounted to the support frame;
         an extendible member configured to extend between the movable element and a static member mounted on the support frame, the extendible member being configured to be movable between a compressed state and an extended state; wherein
         the movable element is configured to be mounted to the support frame such that on extension of the extendible member the movable element is pushed downwards and the at least one support portion moves below a base of the support frame and provides a lifting force to the support frame.

17. The integrated vacuum system of claim 16, wherein the support frame comprises two frame lifting mechanisms, wherein the two frame lifting mechanism are mounted to the support frame on opposing sides of the support frame and within an outer envelope of the support frame.

18. The integrated vacuum system of claim 17, wherein the two frame lifting mechanisms are mounted to the support frame such that the extendible mechanisms of the two frame lifting mechanism are located in line with the centre of gravity between the two sides of the support frame that the lifting mechanisms are not mounted adjacent to.

19. The integrated vacuum system of claim 16, wherein the base of the support frame comprises at least one passage extending through the base, and a sleeve extending around and vertically upwards from an upper opening of each of the at least one passage, the sleeve being configured to receive and guide the at least one support portion.

* * * * *